Sept. 10, 1929. S. VERNET Re. 17,431
CAR HEATER
Original Filed June 21, 1927
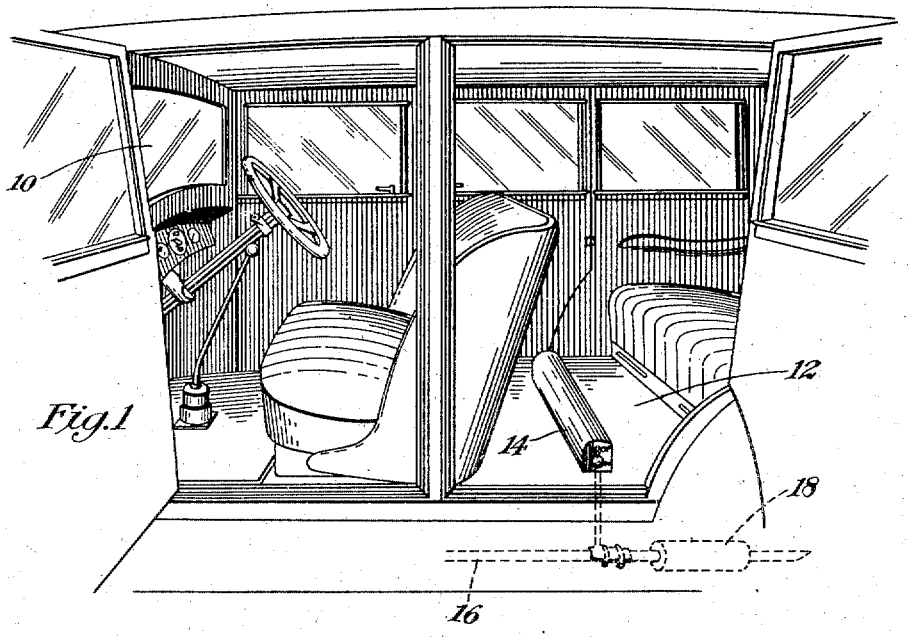
Fig.1
Fig.2
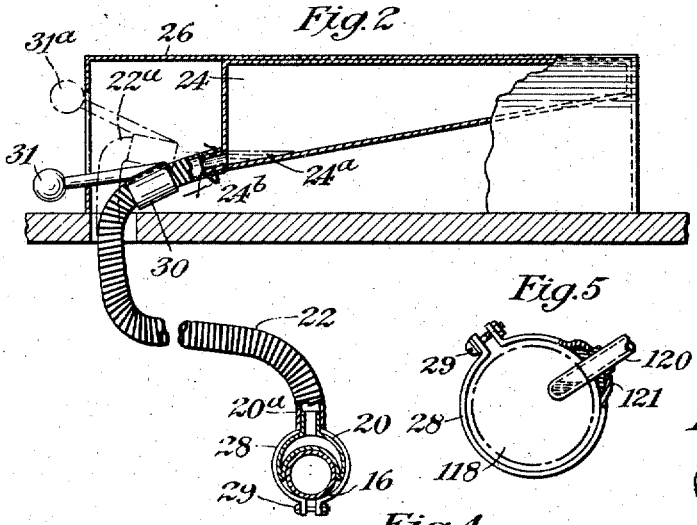
Fig.3
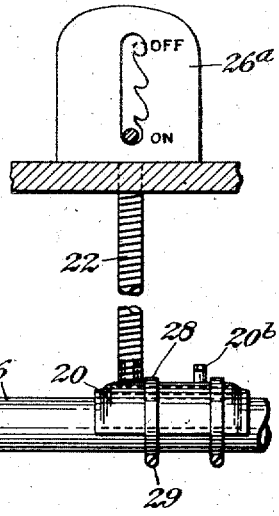
Fig.5
Fig.4
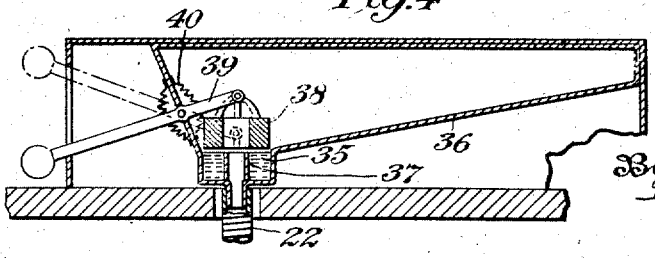
Inventor,
Sergius Vernet.
By Andrew Wilson.
His Attorney Reissued Sept. 10, 1929. Re. 17,431

UNITED STATES PATENT OFFICE.

SERGIUS VERNET, OF BROOKLYN, NEW YORK.

CAR HEATER.

Original No. 1,705,550, dated March 19, 1929, Serial No. 200,328, filed June 21, 1927. Application for reissue filed July 24, 1929. Serial No. 380,738.

This invention relates to an improvement in heaters for automobiles, buses, trucks and other vehicles operated by internal combustion engines, and particularly to a heater which is operated by the heat of the exhaust gases of the internal combustion engine.

Various means for heating the interior of automobiles, buses, trucks and other vehicles operated by internal combustion engines from the exhaust heat of the engine have been devised. In some of these heaters the exhaust gases are conducted directly through the passenger compartments, in others a bypass receiving a portion of the exhaust gases and conducting them through a suitable radiator has been used.

In general these heaters are subject to serious difficulty, because they sometimes become overheated to the extent that the dirt and dust which is collected around them is burned and gives off an unpleasant odor. Leaks also occur admitting carbon monoxide into the passenger compartment. Metal pans have to be furnished with these heaters so that when they are installed they are kept away from any water or combustible material. Their installation is difficult in so far as the exhaust pipe has to be cut and connections made from it to the heater. They also increase the back pressure in the exhaust pipe which in turn affects the efficiency of the engine.

The valves in this type of heater, being directly in the passage of the exhaust gases, become oxidized and also covered with carbon to the extent that they often cease functioning making it impossible to turn the heater on and off.

The type of heater which uses hot air heated by the exhaust pipe and then led into the passenger compartment is subject to the difficulty that all the objectionable odors around the exhaust pipe and the engine are conveyed with the hot air into the vehicle, as well as a lot of road dust and dirt.

It is the principal object of this invention to provide a motor vehicle heater which will obviate the above disadvantages and will satisfactorily and efficiently heat the vehicle body and which is self-regulated.

It is another object of this invention to provide a heater for a motor vehicle body operating from the heat of the exhaust gases which may be under accurate control at all times, and which will heat efficiently.

It is a further object of this invention to provide an automobile heater, including as the heating medium a vapor condenser system suitably connected with the exhaust pipe to receive heat of vaporization therefrom, and to conduct the vapor to a condenser radiator where the vapor gives up its heat and is condensed and returned to be revaporized by the exhaust heat.

It is still another object of this invention to provide a vapor heater for a motor vehicle which, regardless of the heat of the exhaust gases, will not become overheated and will not give off objectionable odors or permit exhaust or other gases to enter the passenger compartment.

Another object of the invention is to provide a simple closed system vapor heater, which will be of low initial cost, easy to install and inexpensive to operate.

Further objects and advantages of this invention will appear from the following detailed description of the attached drawings which illustrate a preferred form of embodiment of my invention and in which:

Fig. 1 is a diagrammatic view of a closed car body showing the location of my improved heater therein.

Fig. 2 is a side elevation partly in section showing a construction of the heater.

Fig. 3 is an end view of the heater shown in Fig. 2 illustrating the connection between the heater and the exhaust pipe, as well as the control valve.

Fig. 4 is a side elevation partly in section similar to Fig. 2 showing a modified form of control means.

Fig. 5 is an end view of a further modified form of vapor generator or reservoir.

The automobile 10 shown diagrammatically in Fig. 1, is a typical enclosed private automobile and has the rear compartment 12 in which a heater 14 constructed according to an adaptation of my invention is located and is supplied with heat from the exhaust pipe 16 shown in dotted lines between the engine (not shown) and the muffler 18.

It is obvious that this heater might be placed in either an open or a closed car and may be placed in either the front or the rear compartment thereof, or may be used on buses, trucks and other automotive vehicles as desired.

In the specific form of the invention illustrated, the heater comprises a hollow shoe or reservoir 20 to be attached over the exhaust pipe and to be connected by a flexible hose or conduit 22 to the condenser 24 enclosed in a suitable frame 26. The reservoir or vapor generator 20 is preferably made of a thin metal which may be made to conform to the shape of the exhaust pipe by means of the bands 28 suitably fastened by nuts and bolts 29. The shoe 20 is made hollow to enclose a small portion of the heating liquid and for the average passenger automobile need hold only approximately five tablespoons of the liquid.

To the upstanding nipple on the heater shoe 20 a flexible conduit 22 is secured by a fluid tight connection and is adapted to conduct the fluid vapor from the reservoir to the condenser 24. The condenser 24 is preferably a stamped vapor-proof metal tank provided with a sump or similar drain portion 24[a] and an outwardly projecting nipple 24[b] to receive the upper end of the vapor conduit 22. A regulating means consisting of an enclosing sleeve 30 with an extended projecting handle 31 is placed over the conduit 22 near the sump or drain of the condenser 24. As will be understood this sleeve 30 of the regulating means merely encloses the conduit 22 and is adapted to raise the conduit to the dotted position as shown in Fig. 2 at 22[a], the handle being raised to the position 31[a] when it is desired to shut off the heater. The metallic housing 26 for the heater provides a neat and attractive external appearance and aids in conducting the heat from the condenser as well as to support and protect the condenser on the car floor. The regulating means 31 comprises an enlarged ball or handle which cooperates with the serrated opening on the end 26[a] of the heater as shown in Fig. 3. Suitable markings on the end adjacent the extreme positions will indicate by inspection, when the heater is on or off.

The operation of this device is as follows:

A suitable fluid such as water or alcohol, carbon tetra-chloride, or the like, or any combination of fluids, having a boiling point between 150 and 212 degrees F., is placed in the shoe or reservoir 20 through the filling cap 20[b] using a limited amount, as before mentioned. The condenser and reservoir are then hermetically sealed preferably under a slight vacuum and the shoe is placed on the exhaust pipe. Under operation of the motor, the exhaust gas will sufficiently heat the liquid to vaporize it, and the vapor will rise to the condenser 24 and will give sufficient heat from the condenser to warm the interior of the vehicle. The vaporized fluid is cooled by this exchange of heat and condensed, and will return thru the conduit 22 to the reservoir 20 and in turn will again be heated, vaporized, give off its heat in the condenser, and return to the reservoir, thus maintaining a continual circulation and effectively warming the car. In case the car compartment becomes too warm, by merely grasping the control handle 31 and moving it from the "on" to the "off" position, the condensed liquid will be unable to return over the high point 22[a] in the conduit, and thus will not run back to the shoe 20, further vaporization will stop, and no more heat will be given off.

No serious effects will take place because of continued heating, inasmuch as the quantity of liquid is so small that it will all be vaporized and the vapor will only be superheated and the superheat pressure of the vapor will not cause rupture of the metallic condenser shell or unduly increase the temperature. By using a liquid having a suitable vaporization point, the heater becomes quickly heated when the engine has started and continues to give off heat until all the vapor is condensed.

A modified form of control means to shut off the heater is shown in Fig. 4 in which a sump portion 35 in the condenser 36 is so enlarged as to receive all the condensed fluid to be used in the system. An upwardly projecting pipe 37 which is an extension of the nipple to which the conduit 22 is connected prevents the fluid when condensed from returning to the shoe 20. A cork or metallic collar 38 attached to the handle 39 is adapted to entirely fill the sump portion and when in its lower position will permit the condensed fluid to return through the nipple to the shoe 20. It will be understood that the heater shoe is connected in the same way to the end of the conduit 22 and that similarly arranged latch means as shown in Fig. 3 will cooperate with the operating handle 39. To shut off this form of heater, the handle 39 is lowered, elevating the collar 38 and permitting all the liquid to remain in the sump 35 so that no further vaporization can take place. A flexible diaphragm 40 of suitable material, such as a metallic bellows, makes an air-tight joint around the handle 39.

A modified form of vapor generator or reservoir 120 is shown in Fig. 5 which is adapted to be used in conjunction with the exhaust muffler 118. The muffler gases are several hundred degrees hotter than the outside of the exhaust pipe and for this reason, the element 120 may be made somewhat smaller and yet be equally effective. It will be held in place, similarly to the shoe 20 shown in Figs. 2 and 3, by a suitable clamp 28, fastened by a securing means 29 and is adapted to retain packing 121 to securely close the opening made in the muffler 118 and to prevent rattles.

In operation this form vaporizes the liquid much quicker than the other because of the higher temperature. There will also be no lagging required to retain the heat and all that will be required to adapt it to a muffler will be to drill a suitable hole therein.

From the above detailed description, it is seen that a very simple and yet highly effective car heater is provided in which the heat can be quickly and adequately transferred from the source, the exhaust pipe, to the heat radiator in the car body, and because of the superheating of the fluid, increased temperature may be obtained without rupture of the parts. When less heat is desired, operation of the control means will either shut the device off entirely or so regulate it as to restrict the fluid returning to the vapor generator to an amount sufficient to produce by its vaporization the desired amount of heat. When the device is warmed and the motor turned off, by merely closing the heater off, the retained fluid will retain its heat temporarily. In such a device as disclosed, there can be no objectionable odors because there is no source of excessive heat and the heater is sealed to retain all of the vapors.

While I have shown a preferred form of embodiment of the device, I am aware that other modifications might be constructed and I therefore, desire protection on the broad scope of the invention as described herein and as claimed in the claims appended hereto.

What I claim as my invention is:

1. In an automobile heater, a vapor pressure heating system, comprising a heating chamber adapted to be heated by the exhaust of the automobile engine, a condenser radiator located in the compartment to be heated, a single exteriorly closed and interiorly uncontrolled conduit between the heating chamber and the radiator, a volatile liquid in said heating chamber adapted to be vaporized by the heat of the exhaust, and to be condensed in the radiator to give off its heat and return to the heating chamber for revaporization, and means to control the heater by preventing the return of liquid to the heating chamber.

2. A vapor heating system for automobiles, comprising a vapor generator, a condenser radiator, a single interiorly uncontrolled conduit to conduct the vapor from the generator to the radiator and to conduct condensate from the radiator to the generator, and means to prevent return of the condensate to the generator, said system being sealed to prevent the escape of vapor therefrom.

3. A heater for automotive vehicles comprising a means to vaporize a liquid, means to conduct the vapor to the passenger compartment of the vehicle, means to warm the passenger compartment, comprising a condenser receiving said vapor, said conducting means being continuously open interiorly and acting to return the condensed liquid from the condenser to the vaporizing means, and adjustable means to prevent the return of condensed liquid.

4. In an automobile heater of the class described, the combination with the exhaust pipe of the engine, of a heater shoe adapted to be heated by said exhaust pipe when said engine is operated, a liquid in said shoe to be vaporized by said heat and means in the automobile body to receive and condense said vapor, a conduit continuously open interiorly to conduct the vapor to the condensing means and to return said liquid to be again revaporized for the purpose of heating the body, and adjustable means to prevent return of said fluid without obstructing said conduit for the purpose of controlling the heater.

5. In a heater for automotive vehicles, propelled by an internal combustion engine, means to convey heat from the exhaust gas comprising a vaporizer, a liquid whose boiling point is substantially equal to or lower than that of water, common means continuously open interiorly to convey the vapor from the vaporizer to the vehicle body and to return the condensed liquid to the vaporizer, means in the vehicle body to receive and condense said vapor and heat the vehicle body, and control means preventing the return of the condensed liquid to the vaporizer without interiorly obstructing the liquid returning means, thereby preventing transfer of heat to the vehicle body.

6. In a vapor heater for motor vehicles, a sealed vapor condenser system comprising means to vaporize a liquid, means to condense said vapor, a continuously open vapor and condensate conductor connecting the vapor heater and the condensing means, and means to regulate the amount of vapor formed by preventing condensed liquid from returning to the vaporizing means without interiorly obstructing the conducting means.

7. In a vapor heater for motor car bodies, a vaporizing chamber containing a liquid, unitary, common means to conduct vapor to the car body and to return condensate to the vaporizing chamber, condenser means to condense said vapor and warm the car body, and means inside the condenser and operative from the outside of said condenser to regulate the heat conveyed by preventing the return of the cooled and condensed liquid to the vaporizing chamber without interiorly obstructing the common conducting means.

SERGIUS VERNET.